Patented Nov. 15, 1932

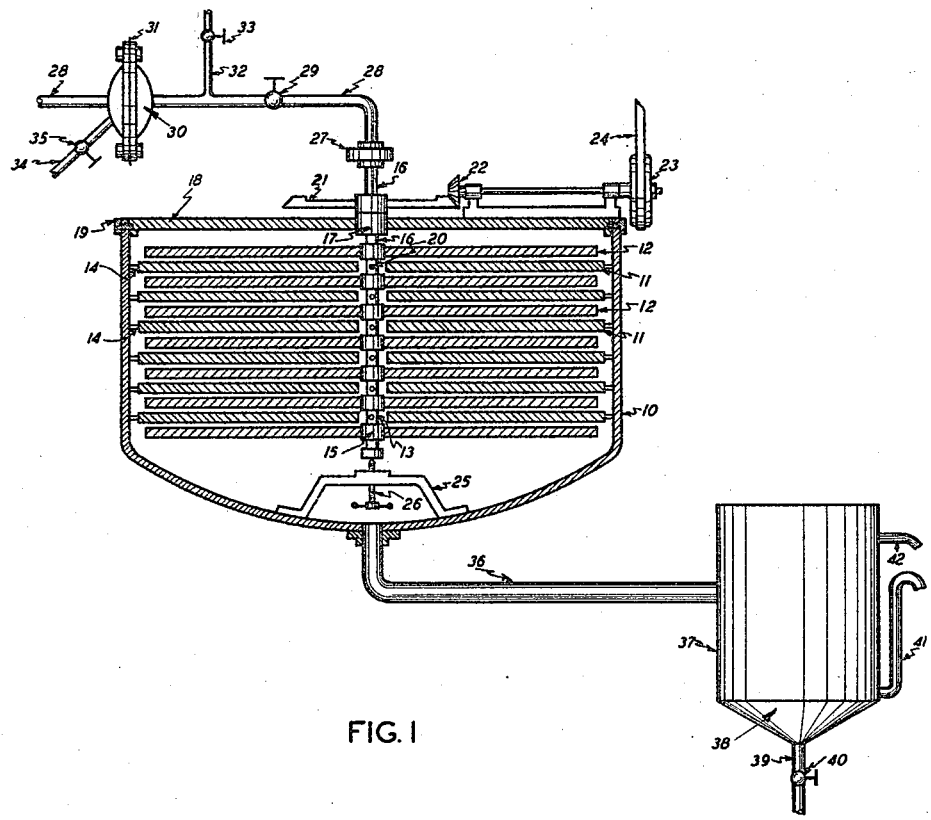
FIG. I
GOTTHOLD H. MEINZER
INVENTOR

1,887,775

UNITED STATES PATENT OFFICE

GOTTHOLD HARRY MEINZER, OF LOS ANGELES, CALIFORNIA, ASSIGNOR TO L. BLAKE-SMITH, OF SAN FRANCISCO, CALIFORNIA

METHOD OF MECHANICALLY TREATING EMULSIONS

Application filed July 30, 1930. Serial No. 471,629.

My invention pertains to the art of breaking or resolving emulsions of oil and water, and is specifically directed to the treatment of petroleum emulsions, though it is by no means limited to such use.

An object of my invention is to cheaply and expeditiously resolve such emulsions by treating them with solid masses of certain solid bodies which have substantially no chemical action on the emulsion and which, for that reason, may be permanently maintained in any desired form.

An object of my invention is to provide an apparatus adapted to maintain the emulsion-breaking solids in fixed space relation while the emulsion is being contacted with them.

An object of my invention is to maintain the emulsion-breaking solids in such form that they cannot be carried out of the apparatus, thus obviating the use of filters or other means for separating these solids from the products of the treatment.

An object of my invention is to provide a means for separating the constituents of an emulsion which will function continuously with no more care than that required to see that the feed is continuous.

The emulsions herein referred to consist of intimate mixtures of oil and water, one of these liquids being very finely subdivided and its particles suspended or dispersed in a continuous mass of the other. In some cases the subdivision of the disperse phase is maintained merely by the surface tension of the films of liquid of the continuous phase adsorbed on the surfaces of the dispersed particles; in other cases viscous liquids, colloids or finely divided solids are present in the interfaces and form films or skins surrounding the liquid particles. Also in many cases finely divided solids (such as clay or shale in oil-field emulsions) are mechanically entrained and suspended along with the emulsion particles proper. When such emulsions are broken by the penetration of the skins and the coalescence of the dispersed liquid particles we obtain as product a mixture of the two liquids together with the material of the emulsion skin and any further solid matter which may be present, the dispersed liquid now being in drops or masses of such size as readily to separate from the continuous phase by sedimentation.

In the class of treatments to which my invention is directed, such emulsions are broken by contacting them simultaneously with two solid materials, one having a preferential surface attraction or "wettability" for water, the other a preferential attraction for oil. Numerous such materials are known and their selection and preparation are described in detail in my co-pending application entitled Method of resolving emulsions, filed July 30, 1930, under Serial No. 471,627.

For the purpose of describing the functioning of my present invention, it is sufficient to state that such substances as serpentine, asbestos, mica, glass, calcite, barite, quartz and lead are preferentially water-wettable in the presence of such substances as galena, pyrite, copper, antimony, silver, sulfur and rubber, the latter named bodies being preferentially oil-wettable in such presence. None of these bodies, separately or in combination, have any material chemical action, so far as is known, on the constituents of the emulsion, and function by drawing apart the aqueous and the oily elements and coalescing the dispersed phase into masses of such size as will readily stratify. The solid masses, if kept clean and free from accumulation of colloidal emulsifying agents or other incidental bodies, will continue to function indefinitely as emulsion resolving agents.

With this explanation the objects and advantages of my invention will be evident from inspection of the attached drawing and the following description thereof, in which:

Fig. 1 is a vertical section of an apparatus suited to the practice of my invention of method.

Referring to the drawing, 10 is a tank or shell, the top of which may be open or closed as preferred. The sole object in enclosing the top would be to protect the interior of the apparatus from the weather and if it is enclosed a vent to the atmosphere should be provided.

Within this tank I place two sets of circular plates, as at 11 and 12. The plates indicated at 11—11 have a central opening 13 and are supported from the wall of the shell in any convenient manner, as at 14. These plates must be of less diameter than the interior of the shell to afford an opening for the downward passage of liquids emerging from between the plates. The plates indicated at 12—12 are mounted on hubs 15—15 attached to a hollow shaft 16, closed at the lower end. This shaft is carried in a long bearing 17 attached to a rigid crossbar 18 which in turn is made fast to the wall of the shell as at 19. This shaft has perforations 20 communicating with its hollow interior for permitting emulsion to pass into the space created by the central openings 13.

The material and construction of the plates 11 and 12 will later be described.

The shaft is adapted to be rotated by means of a large bevel gear 21 cooperating with a small bevel pinion 22 which in turn is driven through a pulley 23 and a belt 24 from any source of power not shown. The relation of sizes of the power transmitting elements should be such that the shaft may rotate very slowly, as say from 1 to 5 R. P. M.

A yoke 25 and an adjusting screw 26 may be used to slightly raise and lower the shaft and its attached plates and thus to center these plates between the fixed plates.

At the upper end of the revolving shaft I place a rotatable slip joint 17 adapted to permit the shaft to revolve in relation to a fixed feed pipe while conducting into its interior, under pressure, the emulsion to be broken. To the fixed end of this joint I attach a conductor 28 communicating with a pump, not shown, or other means of creating a flow of emulsion under pressure. This pipe preferably includes a control valve 29.

As the emulsion often carries sand, grit or other matter which it is undesirable to introduce into the apparatus, it should be filtered. For this purpose I show a simple chamber strainer 30 consisting of two half shells between which is inserted a layer 31 of suitable wire mesh or other straining material. The openings in this screen should be slightly smaller than the minimum distance between any two contiguous plates. As such strainers necessarily become choked in time with the matter removed from the emulsion, an air pipe 32 controlled by a valve 33 may be introduced into pipe 28 between the valve 29 and the strainer, and a drain pipe 34 controlled by a valve 35 may be fixed in the opposite side of the strainer body. By opening valves 33 and 35 with valve 29 closed, compressed air may be used to clean the strainer septum.

The straining element shown is no part of my invention and any form of preliminary strainer or filter may be used, or this operation may be dispensed with if relatively coarse solids are absent from the emulsion. The strainer is a safety provision only and is not requisite to the functioning of the apparatus.

From the lower portion of the shell I lead a pipe 36 to a separating vessel 37 which has preferably a conical bottom 38. To the point of this cone I attach a drain pipe 39 controlled by a valve 40, this pipe being used for the withdrawal of mud or other solid matter which may collect in the bottom of the separator and tend to clog the water overflow.

To the side of the vessel immediately above the cone I attach a water overflow pipe 41 and to the side near the top an oil overflow pipe 42. Pipe 41 should terminate at a level below that of pipe 42 because of the greater weight of the column of water in the former. This device, which is well known and understood and which is not of my invention, will permit the coalesced water and any entrained solids to separate from the oil and will continuously discharge clean oil and clear water without any attention.

The essence of my invention lies in the composition and the relative arrangement of the plates 11 and 12. As already stated I have discovered that emulsions may be broken and the constituent liquid of the dispersed particles coalesced to masses of such size as to be subject to separation by a gravity effect, by bringing these particles into simultaneous or alternate contact with a preferentially water wettable solid and a preferentially oil wettable solid. In the co-pending application and in others in which the same materials are applied to the emulsion in various manners, the water wettable and oil wettable solids are reduced to granules or powders intermixed in and with the oil and separated in one or another manner from the products of resolution of the emulsion. In the present form of this basic invention the two materials are formed into masses—the plates of the above described apparatus—which are brought into a close juxtaposition but not into complete contact, thus permitting a thin film or layer of the emulsion to pass between to adjacent plates in contact with the materials of which they are composed.

It will be evident that the solid materials may be formed into plates or masses in two ways; that is to say, one set of plates, for example, the fixed set of the drawing, may be composed entirely of one of the water wettable materials, and the other set, as, for instance, the revolving plates, may be composed entirely of one of the oil wettable materials. Or, if preferred, all of the plates may be composed of a consolidated mixture of interspersed grains of the water wettable and the oil wettable solids. A purely mechanical modification of the second alternative is to coat plates of some third material with a continuous layer of such interspersed grains.

In the first alternative, each set of plates may be composed of a material having suitable physical characteristics. For instance, the water wettable plates may be composed of serpentine, of glass, or of glass having minute quartz crystals embedded in its surface. The oil wettable plates may be composed of copper, antimony, silver, or hard rubber, or of copper, plated with silver, or of soft copper having finely divided pyrite embedded in its surface or coated by a film of copper sulphide produced by chemical means.

Where this alternative is adopted the spacing of the plates should be extremely close, of the order of 2/1000 to 10/1000 inch, or of capillary dimensions in order that the finest emulsion particles should be brought into a rapidly alternating or simultaneous contact with the two materials having opposite affinities.

If the second alternative is adopted either the water wettable or the oil wettable material may be finely comminuted and embedded in the surface of a plate composed of a material of the opposite class. For instance, finely divided silver, copper or pyrite may be embedded in the surface of a glass plate and the plate thereafter polished in order to insure the presence at its surface of both of the materials. In the same manner and a manner more feasible from a mechanical standpoint, fine quartz crystals may be embedded by pressure in the surface of a plate of copper or of copper electro-plated with silver. Again, a mixture of two powders having opposing affinities may be embedded in, or otherwise attached to, the surface of a sheet of material corresponding in its preferential attraction to that of one of the subdivided materials. Thus a mixture of quartz and pyrite powders may be attached to a glass or serpentine plate, or to a plate of copper or silvered copper, in the former case the glass and the quartz acting together as water wettable materials and in the latter the pyrite and the copper acting together as oil wettable materials.

And finally, any material of the first group and any material of the second group may be powdered or reduced to granules, the powders intermixed and the mixture consolidated into the desired form and consistency by high pressure, with or without the use of a binder. Any binding material must be of such nature as to be chemically inert toward both water and oil, as for instance pyroxylin, and the surface of the plate so formed must be ground and polished in order to develop clean faces of the active materials.

Where the second alternative is followed and the materials are interspersed on the surface of each plate a considerable wider spacing may be permitted between the plates. The extent of this spacing will vary with the distance which the emulsion has to travel in passing from the intake to the outlet edge of the plates, it being only necessary to insure contact of all the emulsion particles with either one of the adjacent plates before the material passes from between them. For example, if the travel of the emulsion is a distance of say two feet the spacing may be not to exceed one-tenth of an inch. Preferably the plates, or one set of them, may be slightly hollowed to give a wider spacing at the center of the plate than at the edge, thus offsetting the difference in area between the central or intake side of the interspace and the outer or discharge side. This applies, of course, only to circular plates which are fed from the center.

The thickness of these plates is immaterial so long as they are sufficiently rigid to maintain their relative positions. There is no action whatever except on the immediate surface of the plate.

In the drawing I have shown a device in which one set of plates is fixed in position while the intermediate plates revolve in relation thereto. This provision is advantageous but is not essential. The advantage lies in the increased movement of the emulsion film due to the relative movement of the plates, this increased movement tending, first, to produce an increased contact between the emulsion material and the plates and, second, to mechanically stress the emulsion skins and thus assist in their rupture by which the particles of dispersed liquid are brought into contact with the water wettable solid. Where the plates are allowed to remain stationary the friction incident to the passage of the emulsion through the narrow passage between the plates produces these same results in a reduced degree and the effect of rotatory movement of one set of plates is probably equivalent in degree to the increased distance travelled by the emulsion in making its way from the center to the outer edge. This increase is in the relation of the length of the spiral described on the revolving plate by a point moving along a fixed radius at a speed equal to the radial travel of the emulsion to the length of the radius itself.

The apparatus described will operate in either manner though if the use of fixed plates were preferred it would be more reasonable to make them of a rectangular form and feed them from one edge instead of from the center.

The functioning of the apparatus above described is as follows. The emulsion first passes through the strainer 30 which removes any coarse or abrasive solids. It then passes into the hollow shaft, emerges from the perforations 20 and passes between the plates 11 and 12 to the side of the shell. During this passage the emulsion is broken and the effluent from between the plates will consist of one of the constituent liquids containing coalesced drops of the other liquid. This mixture drips or flows into the bottom of shell 10 and passes thence through pipe 36 into separator 37 at a point midway its height. In this separator the oil rises to the surface and overflows through pipe 42, the water subsides and overflows through pipe 41 and any mud or other solid matter present sinks to the point of the cone and is withdrawn through pipe 39.

This modification of my broad invention is particularly suited to use at isolated points, as where the emulsion in a tank or a small group of tanks is to be cleaned. It can be built in such size as to be readily portable, requires substantially no more power than that required to pump the emulsion and can be kept in operation with no more than the occasional attention of a single operator.

It is permissible and, in many cases desirable, to heat the emulsion prior to passing it into the apparatus, for the prime purpose of reducing the viscosity of the oil phase and melting any contained wax. This step is well known and understood as it has been used in many demulsification processes of the prior art. I prefer to heat the emulsion to such a temperature as will render it as fluid as possible without incurring the risk of losing a material quantity of oil by vaporization. In no case must the temperature be above the boiling point of water, and in most cases a temperature of perhaps 120 to 140° F. is to be preferred.

I claim as my invention:

1. A method of resolving an oil and water emulsion, comprising: continuously passing said emulsion between the oppositely disposed surfaces of concrete solid masses composed of a solid material preferentially wetted by water and a solid material preferentially wetted by oil, whereby said emulsion is resolved into its oil and water constituents, and parting said constituents; the perpendicular distance between said oppositely disposed surfaces being not to exceed $\frac{1}{10}$ inch.

2. A method of resolving an oil and water emulsion, comprising: continuously passing said emulsion between the oppositely disposed surfaces of concrete solid masses composed respectively of a solid material preferentially wetted by water and a solid material preferentially wetted by oil, whereby said emulsion is resolved into its oil and water constituents, and parting said constituents; the perpendicular distance between said oppositely disposed surfaces being not to exceed $\frac{1}{10}$ inch.

3. A method of resolving an oil and water emulsion, comprising: continuously passing said emulsion between the oppositely disposed surfaces of concrete solid masses composed of consolidated interspersed grains of a solid material preferentially wetted by water and a solid material preferentially wetted by oil, whereby said emulsion is resolved into its oil and water constituents, and parting said constituents; the perpendicular distance between said oppositely disposed surfaces being not to exceed $\frac{1}{10}$ inch.

4. A method of resolving an oil and water emulsion, comprising: continuously passing said emulsion between the oppositely disposed surfaces of concrete solid masses coated with a material preferentially wetted by water and a material preferentially wetted by oil, whereby said emulsion is resolved into its oil and water constituents, and parting said constituents; the perpendicular distance between said oppositely disposed surfaces being not to exceed $\frac{1}{10}$ inch.

5. A method of resolving an oil and water emulsion, comprising: continuously passing said emulsion between the oppositely disposed surfaces of concrete solid masses coated with interspersed grains of a solid material preferentially wetted by water and a solid material preferentially wetted by oil, whereby said emulsion is resolved into its oil and water constituents, and parting said constituents; the perpendicular distance between said oppositely disposed surfaces being not to exceed $\frac{1}{10}$ inch.

6. A method of resolving an oil and water emulsion, comprising: continuously passing said emulsion between the oppositely disposed surfaces of concrete solid masses composed of two solid materials having jointly the property of resolving said emulsion, whereby said emulsion is resolved into its oil and water constituents, and parting said constituents; the perpendicular distance between said oppositely disposed surfaces being not to exceed $\frac{1}{10}$ inch.

7. A method of resolving an oil and water emulsion, comprising: continuously passing said emulsion between the oppositely disposed surfaces of concrete solid masses composed respectively of two solid materials having jointly the property of resolving said emulsion, whereby said emulsion is resolved into its oil and water constituents, and parting said constituents; the perpendicular distance between said oppositely disposed surfaces being not to exceed $\frac{1}{10}$ inch.

8. A method of resolving an oil and water emulsion, comprising: continuously passing said emulsion between the oppositely disposed surfaces of concrete solid masses composed of consolidated interspersed grains of two solid materials having jointly the property of resolving said emulsion, whereby said emulsion is resolved into its oil and water constituents, and parting said constituents; the perpendicular distance between said oppositely disposed surfaces being not to exceed $\frac{1}{10}$ inch.

9. A method of resolving an oil and water emulsion, comprising: continuously passing said emulsion between the oppositely disposed surfaces of concrete solid masses coated with two materials having jointly the property of resolving said emulsion, whereby said emulsion is resolved into its oil and water constituents, and parting said constituents; the perpendicular distance between said oppositely disposed surfaces being not to exceed $\frac{1}{10}$ inch.

10. A method of resolving an oil and water emulsion, comprising: continuously passing said emulsion between the oppositely disposed surfaces of concrete solid masses coated with interspersed grains of two solid materials having jointly the property of resolving said emulsion, whereby said emulsion is resolved into its oil and water constituents, and parting said constituents; the perpendicular distance between said oppositely disposed surfaces being not to exceed $\frac{1}{10}$ inch.

11. A method of resolving an oil and water emulsion, comprising: continuously passing said emulsion between the oppositely disposed surfaces of concrete solid masses composed of a solid material preferentially wetted by water and a solid material preferentially wetted by oil, said surfaces being maintained in relative movement, whereby said emulsion is resolved into its oil and water constituents, and parting said constituents; the perpendicular distance between said oppositely disposed surfaces being not to exceed $\frac{1}{10}$ inch.

12. A method of resolving an oil and water emulsion, comprising: continuously passing said emulsion between the oppositely disposed surfaces of concrete solid masses composed respectively of a solid material preferentially wetted by water and a solid material preferentially wetted by oil, said surfaces being maintained in relative movement, whereby said emulsion is resolved into its oil and water constituents, and parting said constituents; the perpendicular distance between said oppositely disposed surfaces being not to exceed $\frac{1}{10}$ inch.

13. A method of resolving an oil and water emulsion, comprising: continuously passing said emulsion between the oppositely disposed surfaces of concrete solid masses composed of consolidated interspersed grains of a solid material preferentially wetted by water and a solid material preferentially wetted by oil, said surfaces being maintained in relative movement, whereby said emulsion is resolved into its oil and water constituents, and parting said constituents; the perpendicular distance between said oppositely disposed surfaces being not to exceed $\frac{1}{10}$ inch.

14. A method of resolving an oil and water emulsion, comprising: continuously passing said emulsion between the oppositely disposed surfaces of concrete solid masses coated with a material preferentially wetted by water and a material preferentially wetted by oil, said surfaces being maintained in relative movement, whereby said emulsion is resolved into its oil and water constituents, and parting said constituents; the perpendicular distance between said oppositely disposed surfaces being not to exceed $\frac{1}{10}$ inch.

15. A method of revolving an oil and water emulsion, comprising: continuously passing said emulsion between the oppositely disposed surfaces of concrete solid masses coated with interspersed grains of a solid material preferentially wetted by water and a solid material preferentially wetted by oil, said surfaces being maintained in relative movement, whereby said emulsion is resolved into its oil and water constituents, and parting said constituents; the perpendicular distance between said oppositely disposed surfaces being not to exceed $\frac{1}{10}$ inch.

16. A method of resolving an oil and water emulsion, comprising: continuously passing said emulsion between the oppositely disposed surfaces of concrete solid masses composed of two solid materials having jointly the property of resolving said emulsion, said surfaces being maintained in relative movement, whereby said emulsion is resolved into its oil and water constituents, and parting said constituents; the perpendicular distance between said oppositely disposed surfaces being not to exceed $\frac{1}{10}$ inch.

17. A method of resolving an oil and water emulsion, comprising: continuously passing said emulsion between the oppositely disposed surfaces of concrete solid masses composed respectively of two solid materials having jointly the property of resolving said emulsion, said surfaces being maintained in relative movement, whereby said emulsion is resolved into its oil and water constituents, and parting said constituents; the perpendicular distance between said oppositely disposed surfaces being not to exceed $\frac{1}{10}$ inch.

18. A method of resolving an oil and water emulsion, comprising: continuously passing said emulsion between the oppositely disposed surfaces of concrete solid masses composed of consolidated interspersed grains of two solid materials having jointly the property of resolving said emulsion, said surfaces being maintained in relative movement, whereby said emulsion is resolved into its oil and water constituents, and parting said constituents; the perpendicular distance between said oppositely disposed surfaces being not to exceed $\frac{1}{10}$ inch.

19. A method of resolving an oil and water emulsion, comprising: continuously passing said emulsion between the oppositely disposed surfaces of concrete solid masses coated with two materials having jointly the property of resolving said emulsion, said surfaces being maintained in relative movement, whereby said emulsion is resolved into its oil and water constituents, and parting said constituents; the perpendicular distance between said oppositely disposed surfaces being not to exceed $\frac{1}{10}$ inch.

20. A method of resolving an oil and water emulsion, comprising: continuously passing said emulsion between the oppositely disposed surfaces of concrete solid masses coated with interspersed grains of two solid materials having jointly the property of resolving said emulsion, said surfaces being maintained in relative movement, whereby said emulsion is resolved into its oil and water constituents, and parting said constituents; the perpendicular distance between said oppositely disposed surfaces being not to exceed $\frac{1}{10}$ inch.

21. Apparatus for resolving an oil and water emulsion, comprising: a plurality of solid bodies having faced surfaces, said surfaces of each two adjacent bodies being oppositely disposed and separated by not to exceed $\frac{1}{10}$ inch, said surfaces being composed of two dissimilar materials having jointly the property of resolving said emulsion; means for passing said emulsion through the interspaces between said surfaces for resolving said emulsion into its oil and water constituents; means for collecting said constituents and means for parting said collected constituents.

22. Apparatus for resolving an oil and water emulsion, comprising: a plurality of solid bodies having faced surfaces, said surfaces of each two adjacent bodies being oppositely disposed and separated by not to exceed $\frac{1}{10}$ inch, the surfaces of alternate bodies being composed respectively of two dissimilar materials having jointly the property of resolving said emulsion; means for passing said emulsion through the interspaces between said surfaces for resolving said emulsion into its oil and water constituents; means for collecting said constituents and means for parting said collected constituents.

23. Apparatus for resolving an oil and water emulsion, comprising: a plurality of solid bodies having faced surfaces, said surfaces of each two adjacent bodies being oppositely disposed and separated by not to exceed $\frac{1}{10}$ inch, said surfaces being composed of two dissimilar materials having jointly the property of resolving said emulsion; means for maintaining said oppositely disposed surfaces in relative movement; means for passing said emulsion through the interspaces between said surfaces for resolving said emulsion into its oil and water constituents; means for collecting said constituents and means for parting said collected constituents.

24. Apparatus for resolving an oil and water emulsion, comprising: a plurality of solid bodies having faced surfaces, said surfaces of each two adjacent bodies being oppositely disposed and separated by not to exceed $\frac{1}{10}$ inch, the surfaces of alternate bodies being composed respectively of two dissimilar materials having jointly the property of resolving said emulsion; means for maintaining said oppositely disposed surfaces in relative movement; means for passing said emulsion through the interspaces between said surfaces for resolving said emulsion into its oil and water constituents; means for collecting said constituents and means for parting said collected constituents.

In witness that I claim the foregoing I have hereunto subscribed my name this 2nd day of July, 1930.

GOTTHOLD HARRY MEINZER.